United States Patent
Wimmer et al.

(10) Patent No.: US 8,258,405 B2
(45) Date of Patent: Sep. 4, 2012

(54) SENSOR FOR A HARDWARE PROTECTION SYSTEM FOR SENSITIVE ELECTRONIC-DATA MODULES PROTECTING AGAINST EXTERNAL MANIPULATIONS

(75) Inventors: Anton Wimmer, Reichersbeuern (DE); Peter Wolf, Niedereschach (DE)

(73) Assignee: Siemens Aktiengesellschaft, Munich (DE)

( * ) Notice: Subject to any disclaimer, the term of this patent is extended or adjusted under 35 U.S.C. 154(b) by 758 days.

(21) Appl. No.: 11/988,091

(22) PCT Filed: Jun. 30, 2005

(86) PCT No.: PCT/EP2005/053108
§ 371 (c)(1),
(2), (4) Date: Dec. 31, 2007

(87) PCT Pub. No.: WO2007/003226
PCT Pub. Date: Jan. 11, 2007

(65) Prior Publication Data
US 2009/0107712 A1    Apr. 30, 2009

(51) Int. Cl.
*H05K 1/00*    (2006.01)
(52) U.S. Cl. ............................................. 174/250
(58) Field of Classification Search .......... 361/717–800; 174/250, 255, 260, 261; 257/685, 686, 690, 257/700, 723, 724
See application file for complete search history.

(56) References Cited

U.S. PATENT DOCUMENTS

| | | | |
|---|---|---|---|
| 4,807,284 A | 2/1989 | Kleijne | |
| 5,233,505 A | 8/1993 | Chang et al. | |
| 5,269,378 A * | 12/1993 | Maas et al. | 169/48 |
| 5,285,734 A | 2/1994 | MacPherson | |
| 5,570,274 A | 10/1996 | Saito et al. | |
| 6,075,700 A | 6/2000 | Houghton et al. | |
| 6,344,688 B1 | 2/2002 | Wang | |
| 6,853,093 B2 | 2/2005 | Cohen et al. | |
| 2001/0054758 A1 | 12/2001 | Isaak | |
| 2003/0174478 A1 | 9/2003 | Oggioni et al. | |
| 2004/0089943 A1 | 5/2004 | Kirigaya et al. | |
| 2004/0120101 A1 | 6/2004 | Cohen | |

FOREIGN PATENT DOCUMENTS

| | | |
|---|---|---|
| CN | 1510810 | 7/2004 |
| DE | 195 12 266 | 3/1996 |
| DE | 10045025 | 4/2001 |
| DE | 100 47 436 | 8/2002 |
| EP | 0526066 | 2/1993 |
| FR | 2 758 935 | 7/1998 |
| JP | 6-24477 | 2/1994 |
| JP | 2003/229510 | 8/2003 |
| JP | 2004-158700 | 6/2004 |
| JP | 2005-116897 | 4/2005 |
| WO | 03/019467 | 3/2003 |

(Continued)

OTHER PUBLICATIONS

Japanese Office Action issued May 12, 2010 in corresponding Japanese Patent Application 2008-519802.

(Continued)

*Primary Examiner* — Jeremy Norris
*Assistant Examiner* — Tremesha S Willis
(74) *Attorney, Agent, or Firm* — Staas & Halsey LLP (57) ABSTRACT

A hardware protection system for sensitive electronic-data modules protects against external manipulations. As a result, the sensor has a correspondingly adapted layout.

23 Claims, 6 Drawing Sheets

FOREIGN PATENT DOCUMENTS

| | | |
|---|---|---|
| WO | 1432031 | 6/2004 |
| WO | 2005/041002 | 5/2005 |

OTHER PUBLICATIONS

International Search Report (PCT/ISA/210) of International Application PCT/EP2005/053108 (mailed on Apr. 3, 2006).

German language Japanese Office Action for JP 2008-519803, issued on Jul. 14, 2010.

Chinese Office Action for CN 200580051453.6, issued on Nov. 6, 2009.

International Search Report (PCT/ISA/210), mailed Mar. 9, 2006 in connection with the International Application PCT/EP2005/053111.

U.S. Office Action for U.S. Appl. No. 11/988,093, mailed on Jan. 4, 2011.

U.S. Office Action for U.S. Appl. No. 11/988,093, mailed on Apr. 26, 2011.

U.S. Office Action for U.S. Appl. No. 11/988,093, mailed on Aug. 13, 2010.

* cited by examiner

SENSOR FOR A HARDWARE PROTECTION SYSTEM FOR SENSITIVE ELECTRONIC-DATA MODULES PROTECTING AGAINST EXTERNAL MANIPULATIONS

CROSS REFERENCE TO RELATED APPLICATIONS

This application claims the benefit under 35 U.S.C. Section 371, of PCT International Application Number PCT/EP2005/053108, filed Jun. 30, 2005, the contents of which are incorporated herein by reference.

BACKGROUND

Electronic modules for highly sensitive data processing and data backup, such as are used for example in tachographs for commercial vehicles, should be protected by hardware against manipulation from outside, such as for example chemical or physical attacks (e.g. mechanical, laser, fire, etc.), so that data cannot be manipulated.

Until now, there has been one solution, by which the electronic modules which are to be protected are packed all around using a so-called anti-drilling foil. Such an anti-drilling foil is available, for example, from the Gore company as a finished product, or it is offered by the Freudenberg company as a foil with a conductive silver paste imprint. On its inside, the foil is connected electrically to the module. After the electronic module has been packed round in three dimensions it is then cast in a container, using synthetic resin. If an attempt is made to open the package, then the electrical conducting paths or resistive wires on the foil are inevitably damaged and interrupted at the places where the attacks are made, which leads to the data stored in the electronic module immediately being deleted. As a result, the data cannot be manipulated and the attack from outside is thus detectable by appropriate regulatory authorities.

With this method, known from the related art, there are two problems. On the one hand, the use of foils is not compatible with any assembly procedure which is suitable for electronics. On the other hand, the foil also often becomes damaged during assembly and so there is a high reject rate.

SUMMARY

One potential object is to specify a sensor, for a hardware protection system for electronic modules, which provides a close-meshed cover for a surface/side which is to be protected and which can be integrated into a production process which is compatible with electronics.

Correspondingly, the conductive structures and the insulating gaps of the laminar sensor form a close-meshed shape in the form of a grid, in the form of a network, with meanders and/or with sectors, in which the conducting structures run, for example, in geometrically structured shapes. Here, the insulating gap (the mesh size) between two runs of the conductive structures, in the form of conducting paths or conducting tracks, corresponds to conventional HDI (High Density Interconnection) structures. The same applies to the width of the runs of the conductive structures.

The area over which the laminar sensor extends need not necessarily be two-dimensional or a plane. Rather, shell-, spherical- or hemispherical-shaped embodiments of the surface are also conceivable, for example. Looked at from the point of view of the main application objective of the laminar sensor, it is an arbitrary surface made up of one or more layers, arranged one behind another, such that a space located behind the surface is protected in that any penetration through the surface can be detected by the laminar sensor.

The laminar sensor has, in particular, a plurality of sensor segments in which the conducting structures are arranged, for example, in spirals.

In particular, the conductive structures of the sensor segments are arranged for each sensor segment in the form of geometric structures running in opposite directions.

Preferably, the start and end points of the conductive structures, with their respective contact points, each lie in the centre of the corresponding geometric shape.

The conductive structures of the counter-directional geometric shapes can with advantage be implemented as parallel conductive runs at different potentials. Here, it is often sufficient if the paths of the conductive runs do not proceed exactly in parallel, but only to the extent that an insulating gap is maintained between them. Alternatively however, exactly parallel courses can be provided. It is also possible for the gaps between conductive paths to have different forms. In this case, one conductive path could be a straight line, and the other a wavy line.

The laminar sensor can have a rewiring layer via which the sensor segments are contacted. Here, the rewiring layer can preferably be arranged on the side of the sensor segment on which the laminar sensor can detect an intrusion.

Alternatively, or as an addition, the laminar sensor is characterized by a plurality of conductive layers, running in different directions relative to the surface, in which the conductive structures are arranged one over another, and between which are arranged insulating layers. Preferably, the conductive structures will follow a meandering course in the conductive layers.

In one method for manufacturing a laminar sensor, conductive structures are arranged on a surface in such a way that insulating gaps result between the runs of the conductive structures, and the conductive structures with the insulating gaps cover the surface. Advantageous embodiments of the method result in an analogous way to the advantageous embodiments of the device, and vice versa.

The types of laminar sensor described can be particularly well integrated into a hardware protection system. To this end, the hardware protection system can be structured as follows.

In accordance with a first possible embodiment, a hardware protection system is in the form of a circuit substrate which has an interior space for components of a circuit which is to be protected, with the conductive structures of the sensor, for detecting unauthorized external manipulation of the circuit, surrounding this interior space. The conductive structures for detecting intrusions into the circuit are thus integrated directly into the circuit substrate of the circuit.

In the event of an unauthorized intrusion into the circuit, the conductive structures are damaged, so that a contact is closed or broken and the intrusion into the circuit is thereby detected.

Preferably, the circuit substrate will have a circuit board. This circuit board can have, on and/or in the side proximal to the interior space, at least some of the components of the circuit to be protected. Over and above this, it can have, on and/or in the side which is shut off from the interior space, some of the conductive structures which surround the interior space.

It is advantageous if the circuit board is a multilayer circuit board or a multilayer ceramic substrate with layers for the conductive structures which surround the interior space and layers for wiring up the relevant components of the circuit to be protected.

The layers for wiring up the relevant components of the circuit to be protected are arranged, in particular, on and/or in the side of the circuit board which is towards the interior space.

So that they cannot be reached from outside, through-contacts (vias) for the circuit to be protected can be implemented in the circuit board as buried vias.

Alternatively or additionally, superficial layers which must be created in the circuit board, for wiring up the relevant components of the circuit which is to be protected, can be made in the form of sequential build-up layers. Vias in the circuit board can be made in the form of buried vias and/or micro-vias (blind micro holes) by a wide variety of technologies (plasma etching, photo-definition or laser drilling).

Preferably, the hardware protection module will have a further multilayer circuit board and/or multilayer ceramic substrate, which is arranged opposite to the first circuit board, and on and/or in one side of which, the side shut off from the interior space, is carried another portion of the conductive structures which surround the interior space, and in particular has on and/or in its side which is towards the interior space further components of the circuit to be protected.

It is advantageous if there is, arranged between the circuit board and the further circuit board, a frame which keeps the two circuit boards apart and thereby creates the interior space, between itself and the circuit boards. The frame is, in particular, constructed using a multilayer circuit board technology or multilayer ceramic substrate, for example by arranging dielectric layers and electrically conducting layers on top of one another layer-by-layer.

The interior space may be a void, but not necessarily. For example, if the components in the interior space are cast in, the interior space is filled up with a casting resin.

The circuit substrate has, in particular, contacts for connecting detection facilities, for detecting any damage to the conductive structures.

Hence the complete circuit substrate is preferably made, at least the important components, using multilayer circuit board technology and/or multilayer ceramic technology.

In the case of a method for manufacturing a circuit substrate for a hardware protection system, which surrounds an interior space for components of a circuit which is to be protected, this circuit substrate is manufactured with the conductive structures which surround the interior space for detecting intrusions to the circuit. Advantageous embodiments of the method derive from the advantageous embodiments of the circuit substrate, and vice versa.

In accordance with a second possible embodiment, a hardware protection system for a circuit which is to be protected has a non-conducting, laminar substrate. However, the laminar substrate is not planar, but has a central area which is set back and which is surrounded, preferably completely, by projecting areas. Arranged on and/or in the substrate are conductive structures for detecting an intrusion into the circuit which is to be protected. In the event of an unauthorized intrusion into the circuit, the conductive structures are damaged, so that a contact is closed or broken and the intrusion into the circuit is thereby detected.

Preferably, the projecting areas have a border which runs parallel to the set-back central area. Using this border, the hardware protection system can be arranged over the circuit substrate area and glued or soldered in position.

In particular, the substrate takes the form of a half-shell.

The substrate will preferably be deep-drawn, a circuit board and/or a foil.

The conductive structures can be manufactured especially simply and cost-effectively by printing. This will preferably be done while the laminar substrate is still flat, that is has not yet been deep-drawn.

The hardware protection system has, in particular, contacts for connecting detection facilities, for detecting any damage to the conductive structures.

In the case of a method for manufacturing a hardware protection system of one of the types outlined above, a laminar substrate is provided having conductive structures for detecting any intrusion into a circuit which is to be protected. Before doing so, or preferably after, the laminar substrate is reformed into a shape in which it has a central area which is set back, which is surrounded by projecting areas. Advantageous embodiments of the method derive from the advantageous embodiments of the hardware protection system and vice versa.

A device has a hardware protection system of one of the types outlined above, and a circuit substrate for a circuit which is to be protected. The hardware protection system is arranged with the projecting areas of its substrate on the circuit substrate, in such a way that between the set-back central area and the circuit substrate there is a space for the circuit which is to be protected.

Preferably, the circuit substrate is or contains a circuit substrate circuit board. Often, the rear side of this must also be protected. To this end the device has, in particular, a second hardware protection system of one of the types outlined above, which is arranged on the opposite side of the circuit substrate from the first hardware protection system.

Furthermore, the device will preferably contain detection facilities for detecting any damage to the conductive structures due to an impermissible intrusion and/or unauthorized manipulation. So that the detection facilities are also protected, they can be implemented as a part of the circuit to be protected.

The complete assembly with the circuit substrates can be used, in particular, in a tachograph, a trip data recorder and/or a rail-bound or non-rail-bound vehicle. However it can, for example, also be used in cash machines, devices for financial institutions and aircraft. In particular, it is always of advantage to use the complete assembly with the circuit substrates when use is made of cryptological keys (RSA, DES) which must be protected.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
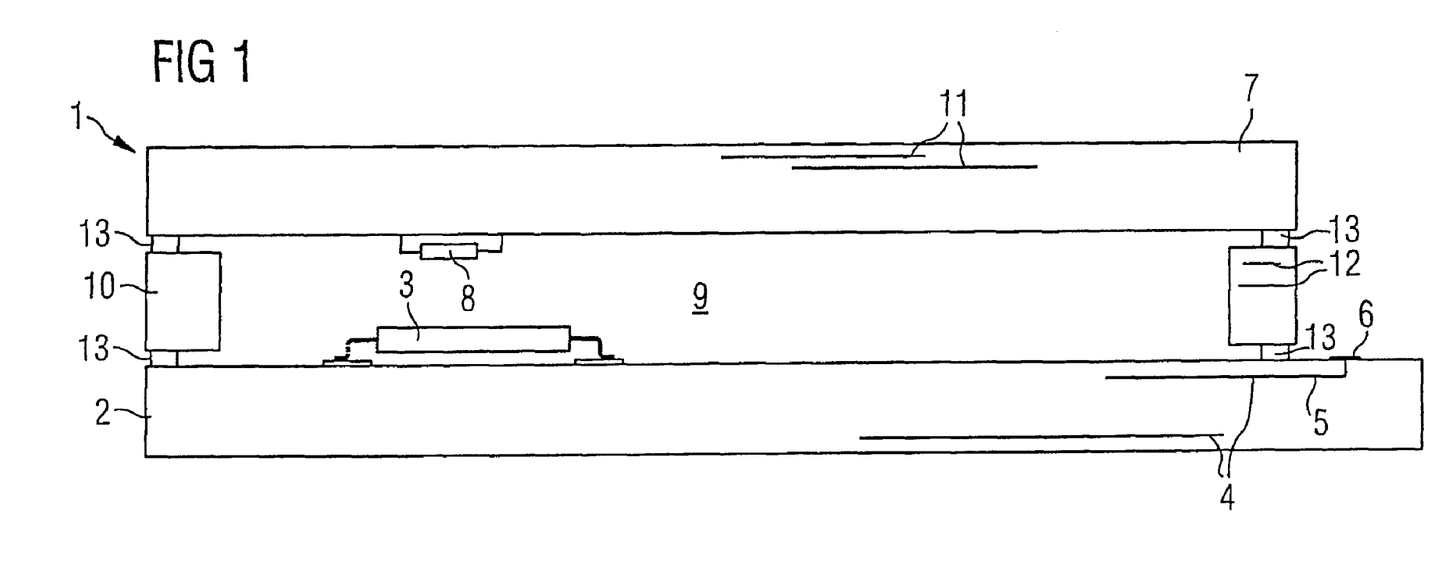
FIG. 1 a schematic diagram of an integrated hardware protection system for electronic modules.
Figure 2:
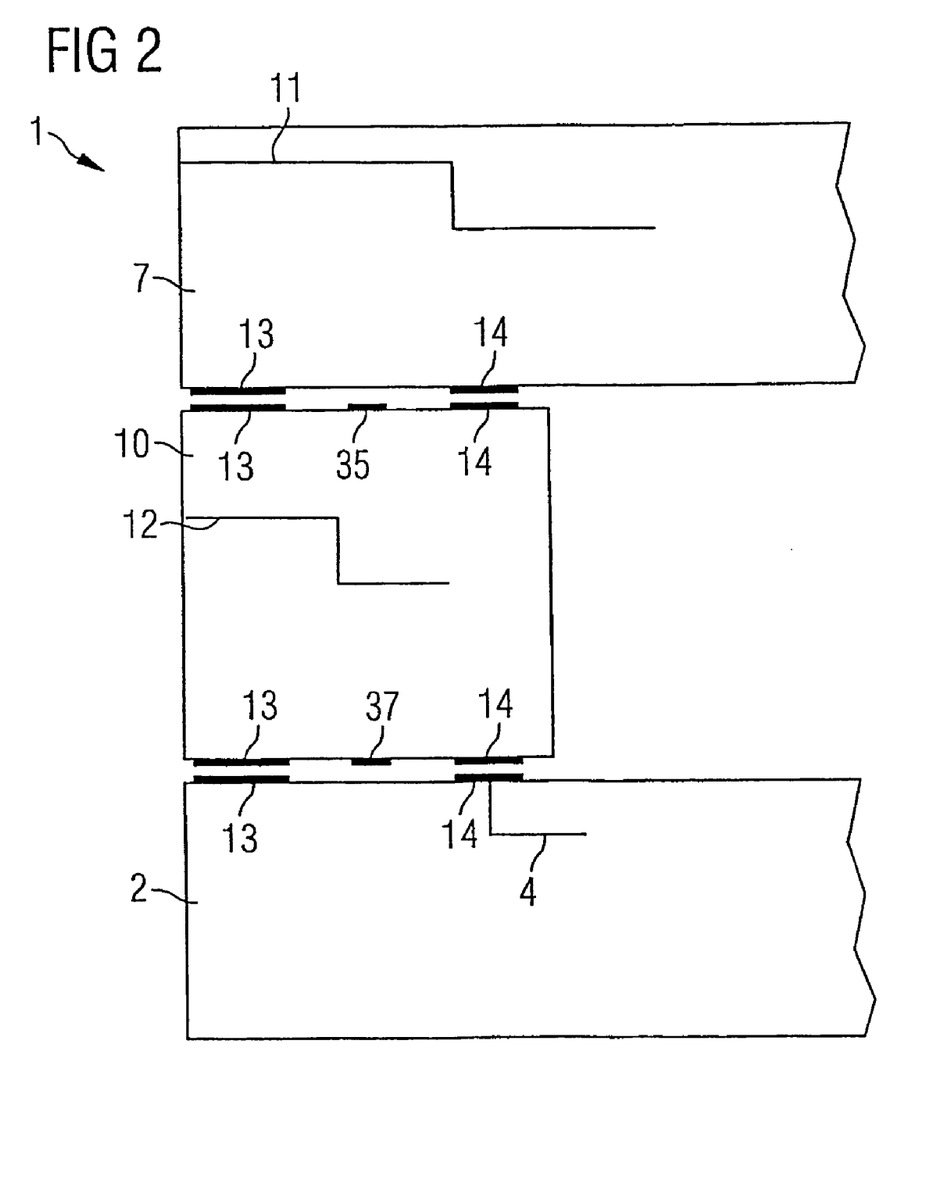
FIG. 2 a schematic diagram of part of the hardware protection system shown in FIG. 1.

In FIG. 1 and FIG. 2 a circuit substrate 1 can be seen with a first submodule in the form of a circuit board 2 with some components 3 of a circuit which is to be protected. The circuit board 2 has conductive structures 4 in the form of a protection layer, as part of a multilayer wiring for detecting intrusion into the circuit which is to be protected. In addition, it has vias 5 to the outside of the circuit substrate for signal wires and the voltage supply, for the circuit which is to be protected. These vias 5 run through the conductive structures which surround the interior space, and terminate at a plug mounting point 6.

The circuit substrate 1 has in addition a further circuit board 7, which has further components 8 of the circuit to be protected.

The further components 8 on the further circuit board 7 are arranged on the side of the further circuit board which is towards the side of the circuit board 2 on which are some of the components 3 of the circuit to be protected. As a result, all the components of the circuit which is to be protected are located between the circuit board 2 and the further circuit board 7, in an interior space 9 formed between the circuit boards.

The circuit board 2 and the further circuit board 7 are held apart by a frame circuit board 10, which is arranged between the two circuit boards and, together with the circuit board 2 and the further circuit board 7, surrounds the interior space 9. The circuit board 2, the further circuit board 7 and the frame circuit board 10 are each made in such a way that the wiring and components 3, 8 of the circuit which is to be protected are arranged in and/or on the sides and/or areas, of the circuit board 2, the further circuit board 7 and the frame circuit board 10, which face the interior space 9. This wiring and the components 3, 8, and hence the entire circuit which is to be protected, are entirely surrounded by a pattern of conductive structures 4 on the circuit board 2, conductive structures 11 on the further circuit board 7 and conductive structures 12 on the frame circuit board 10, each of which is connected electrically to the others. The mutual connections of the conductive structures 11, 12, 4 across the different circuit boards 1,2,10 is effected by contacts 14. These contacts 14 have an irregular arrangement. The conductive structures are coupled to detection facilities for detecting any damage to the conductive structures, which are in the form of special electronic circuitry. The conductive structures can be regarded as belonging to the detection facilities. Connecting frames 13 which run around the outside are electrically coupled to the special electronic module, producing an additional protective function.

Between the wraparound connecting frame 13 and the contacts 14 which serve to connect together the different circuit boards, wraparound conductive structures 35, 37 are provided, these being coupled electrically to the detection facilities.

Figure 3:
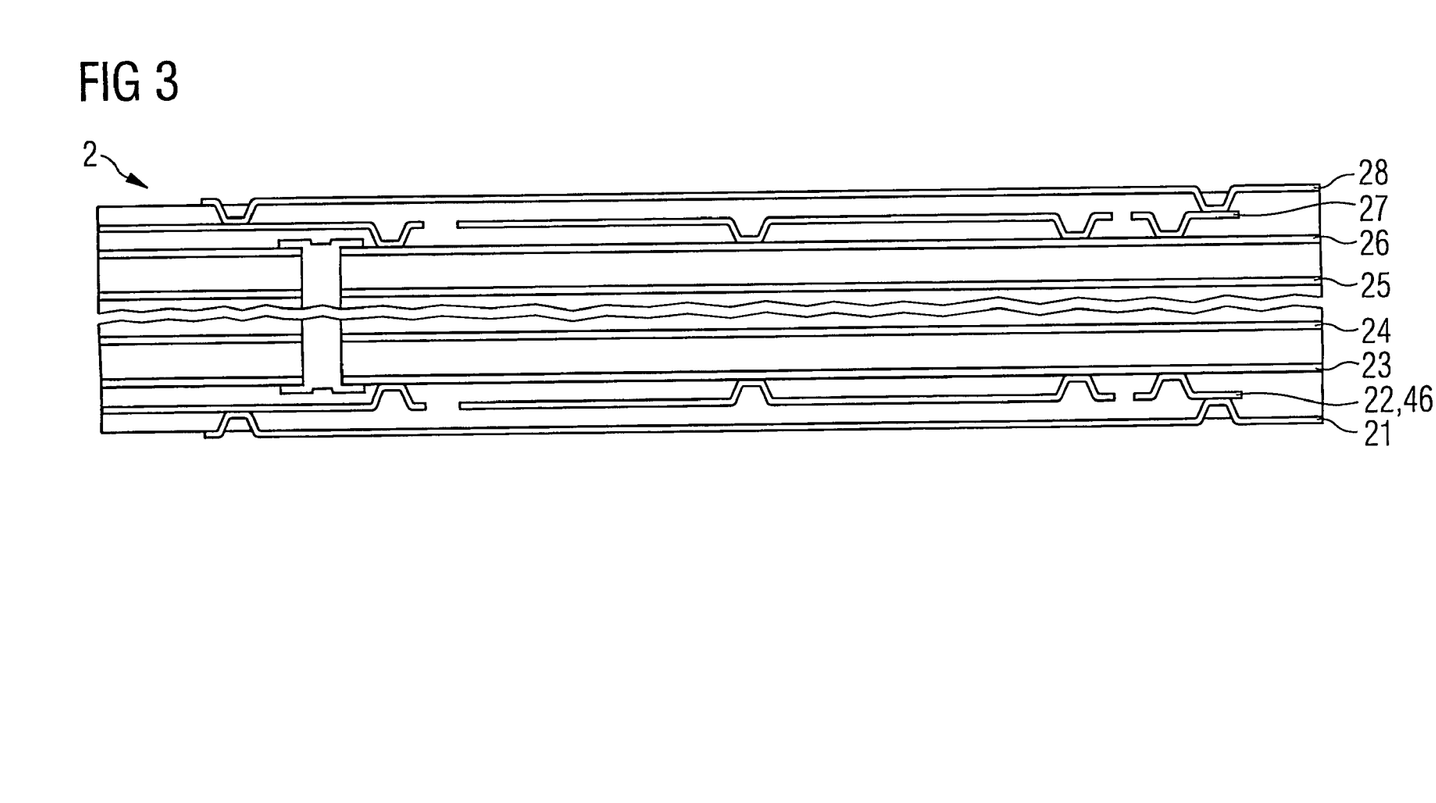
FIG. 3 a cross-sectional schematic diagram of the circuit board construction for the hardware protection system shown in FIG. 1.

FIG. 3 shows the structure of the circuit board 2. This includes a grounding layer 21, at least one hardware protection power layer 22 for the conductive structures 4, at least one hardware protection rewiring layer 23, at least one power supply layer 24, at least one grounding layer 25, a plurality of signal layers 26, 27, 28. The arrangement of the layers is chosen so that the protection layers are outside, and inside are the signal and supply layers.

Figure 4:
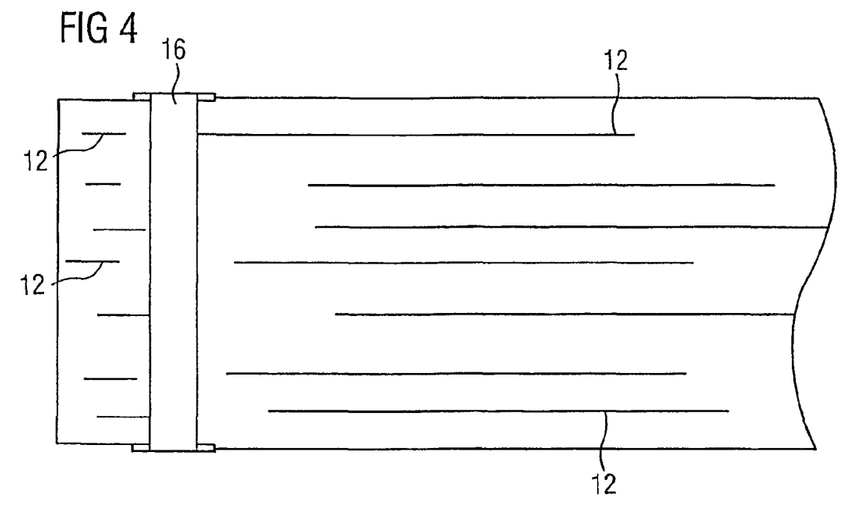
FIG. 4 a schematic frame circuit board for the hardware protection system shown in FIG. 1.

In FIG. 4 one can see the structure of the circuit board for the frame circuit board 10. The frame circuit board 10 is a multilayer circuit board or a multilayer ceramic substrate having n conducting layers, where the space between two conducting planes is less than 500 µm. For the purpose of making mutual contacts between the individual layers, and to the circuit board 2 and the further circuit board 7, the frame circuit board 10 contains through holes 16 in the form of plated through holes, which run perpendicular to the layers of the circuit board 2 to the further circuit board.

The hardware protection against manipulation is thus directly integrated into the electronic module, i.e. into the circuit boards 2, 7 used for the module. This results in an integrated hardware protection system for electronic modules, in the form of a circuit substrate 1, with conductive structures for the detection of intrusions into the circuit which is located in the interior space 9 of the circuit substrate 1.

For this purpose, the embodiment of the module is constructed in such a way that it has two submodules, where each of the submodules is fitted on one side only with components, in the form of components 3, 8 of the circuit to be protected.

The circuit bards 2, 7 for these submodules are in such a form that they are made as multilayer circuit boards, where the inner and outer layers of the component-mounting side, required for the wiring of the components 3, 8, are shut in and have no electrical through-contacts leading to the outside on the rear side of the circuit board, that is the side opposite to the component-mounting side.

To this end, the through-contacts required for the functioning of the modules in the circuit to be protected are made in the form of buried through-contacts (buried vias), or the superficial layers required for the wiring of the submodules are made as an SBU (sequential build up) with micro-via through-contacts produced using plasma etching, photo-lithographically or by laser drilling. To do this, sequential build up layers are applied to an existing core and are provided with micro-vias.

On the component-mounting side, the submodule circuit boards have contact pads outside the component mounting area, arranged as an array, these being used later to make "face to face" electrical connection between the two submodules, each with components mounted on one side, via the frame 10, in the form of a multilayer circuit.

The circuit boards 2, 7 for the submodules also contain, on the side opposite to the component-mounting side, that is on the side which is shut off from the interior space 9, several conducting layers. These can be implemented, for example, as multilayer copper layers, with conductive structures 4, 11, each of which is realized as very finely structured conductive paths which on the one hand cover the entire area of the layer with a close mesh and on the other hand, however, extend from one layer to another, depending on the form of the conductive paths.

The widths of the conductors on one layer cover the insulating gaps, and part of their associated conductive tracks, on the layers lying underneath them, from which the dielectric separates them.

They too are again wired through to the inside by buried vias or micro-vias to the module.

The embodiment of a layer, for example in the x-direction with a meandering structure of this type made of narrow copper conductive tracks, and the layers lying below or above it in the y-direction with a structure of this type, separated from each other by a dielectric layer, produces a hardware protection system against mechanical manipulation of the module, by the fact that these conductive paths 4, 11 have an inward connection to the module and hence, due to the ultra-fine structuring, are damaged in the event of an intrusion from outside. This results in a break and/or a short circuit of conductive structures 4, 11, which is registered in the circuit or module, as applicable.

The ultra-fine conductors can also be designed as resistive paste imprints (integrated resistors with defined resistance values), as conducting paste (ceramic thick film technology) or by ink-jet printing using carbon ink (integrated resistors with defined resistance values) with any conceivable structures, which over a wide area of at least one layer create a close-mesh pattern and which electrically are connected inward to the module.

At least one of the circuit boards 2, 7 for the submodules can also be made as a flex-rigid circuit board, or a flexible wire can be attached to a rigid circuit board for data transmission purposes, as appropriate.

The spacing of the dielectric for the hardware protection layers in the circuit boards for the submodules is chosen so that even if they are drilled on the end face this results in damage to the protective layers lying above and below, so that the protection mechanism is triggered. For example, the frame 10 could be made in rigid form and the two circuit boards 2, 7 for the submodules also as flexible circuits.

For the purpose of connecting the two submodules which are arranged "face-to-face", use is again made of a circuit board design made in a similar way to that described above. This circuit board is designed as a frame 10, and made in multilayer form which, by its construction, prevents the entire module from being attacked later on its side face. In general this is achieved by a spacing between individual layers of less than 500 μm. Within the layout for the protective circuitry lie the electrical through-contacts 16, which in the assembled state connect the two submodules electrically. In those areas of the layout which contain the conductive structures 12 for the protection function, in the form of conducting paths or printed resistors or similar, lie the drilled through-contacts for the individual layers of the protective circuitry, irregularly distributed. Both types of through contact are fed out to contact pads on the upper and lower sides of the frame-like multilayer circuit board for the frame 10, to be used later for making contacts to the individual submodules.

The electrical connection and the mechanical joining of the submodules to the frame circuit board can be effected by soldering followed by sealing of the solder gap by adhesive, by lamination, by contact adhesive or in a similar manner.

The approach described produces a sensor system, integrated into the circuit substrate in the form of circuit boards, which can be manufactured using conventional "high-tech" circuit board technology and can have components inserted and be processed on conventional component insertion lines in electronic assembly production facilities. Furthermore, there is the advantage that a secure, cost-effective security system which reliably detects hardware attacks, which can be processed at no extra assembly cost, is provided and integrated directly in the electronic module.

Figure 5:
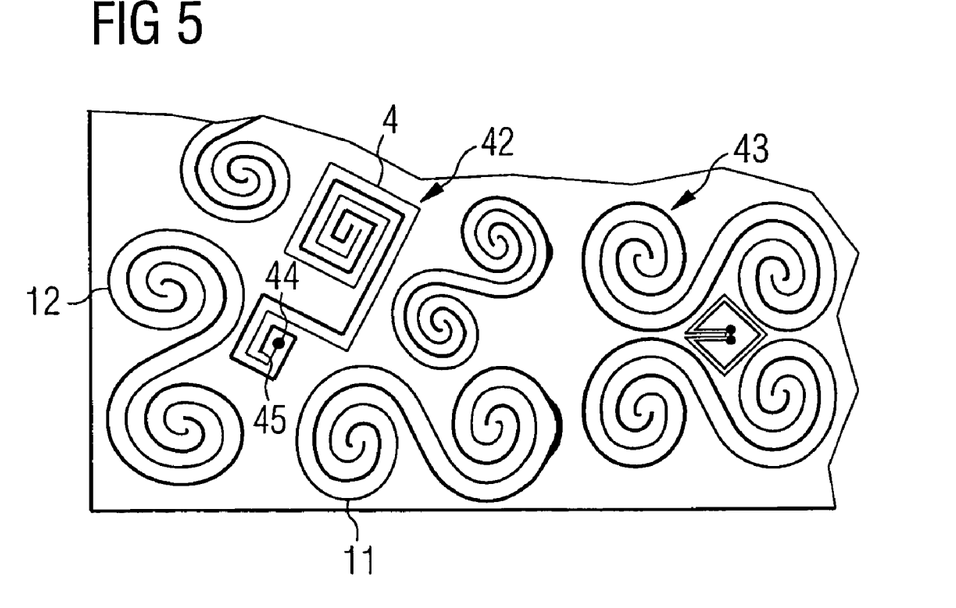
FIGS. 5 to 7 schematic conductive structures for a laminar sensor for the processor circuit board or the detector circuit board.
Figure 6:
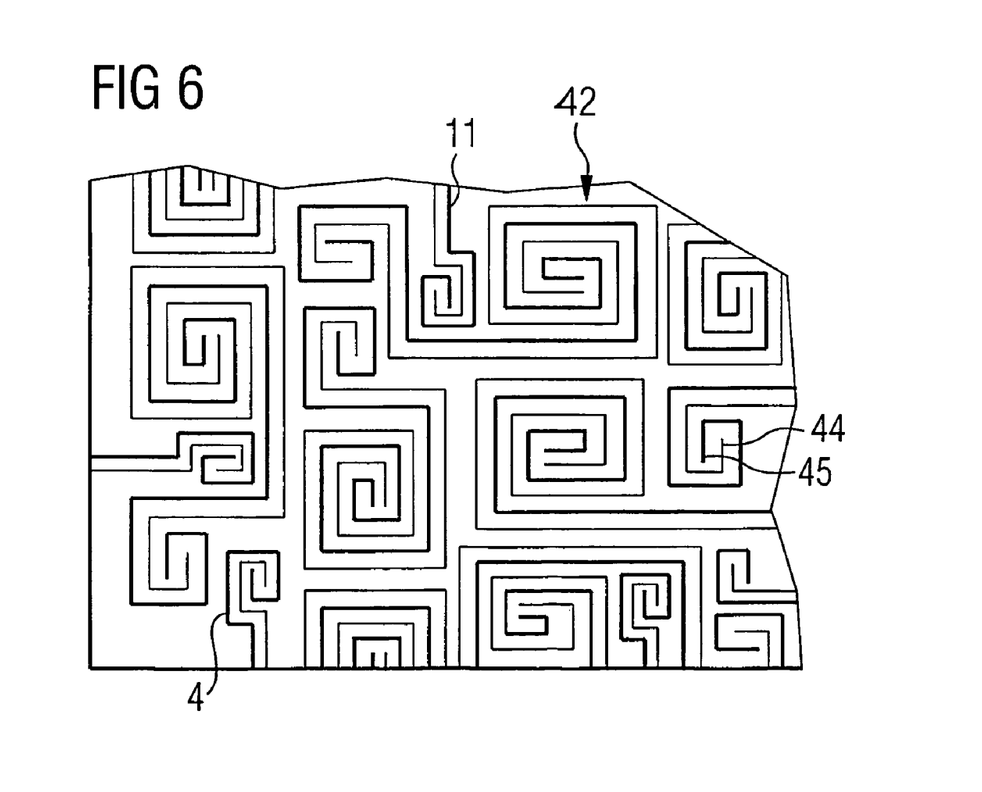
Figure 7:
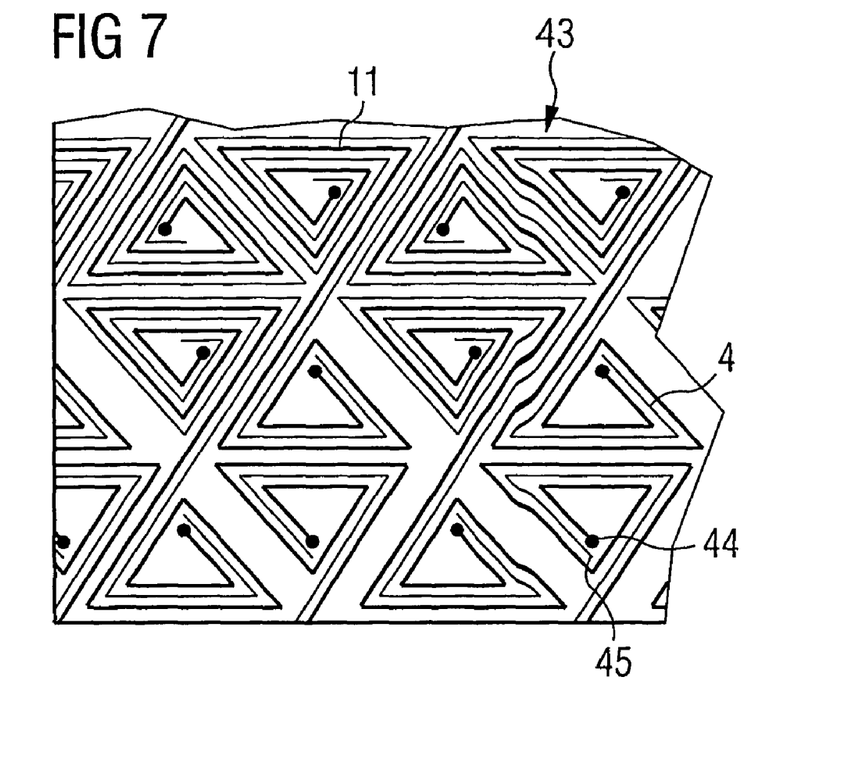

FIGS. 5 to 7 show a plan view of an embodiment for the conductive structures 4 of the laminar sensor for the circuit board 2. The conductive structures 11 of the laminar sensor for the further circuit board 7 can be structured similarly to the conductive structures 4 of the circuit board 2.

The conductive structures 4 take the form of a meandering laminar circuitry structure for hardware protection against manipulation, which is integrated directly into the circuit board 2 used for the circuit's electronic module.

The structure of the conductive structures 4 of the laminar sensor is in such a form that the laminar sensor contains individual sensor segments/structures 42, 43 which have a meandering structure, made up of angular and/or rounded geometric sensor segments/structures 42, 43 which run in opposite directions. The start and end points 44, 45 of the geometric structures with their respective contact points each lie in the center of the corresponding sensor segments/structures 42, 43.

The form of the two geometric sensor segments/structures 42, 43 which run in opposite directions, with a meandering structure of this type, includes in each case two narrow copper conducting tracks at different potentials, running broadly in parallel.

The wiring of the individual sensor segments/structures 42, 43 is effected via a rewiring layer 46 which lies beneath them, that is on the side distal to the outer side of the hardware protection system, which again contains narrow copper conducting tracks, via which the sensor segments/structures 42, 43 are connected together in the basic electrical connection modes. The rewiring layer 46 can also, like the sensor layer, have geometric sensor segments/structures 42, 43 running in opposite directions.

The layer for the sensor segments/structures 42, 43 is separated from the rewiring layer 46 by a dielectric layer, and only connected to it electrically by partial blind-hole through-contacts such as for example laser-drilled μ-vias or alternatively by plasma-etched or photolithographically produced blind-hole through contacts.

This combination produces for the modules of the circuit to be protected a protection in hardware form against manipulation of any type from outside. The entire network of conductive paths in the conductive structures 4, 11, 12, or even subnetworks of combinations of conductive paths, are connected inwards to the modules of the circuit and, if attacked, their ultra-fine structuring means that from a break or short circuit they recognize a possible attack, which is registered in the circuit.

Figure 8:
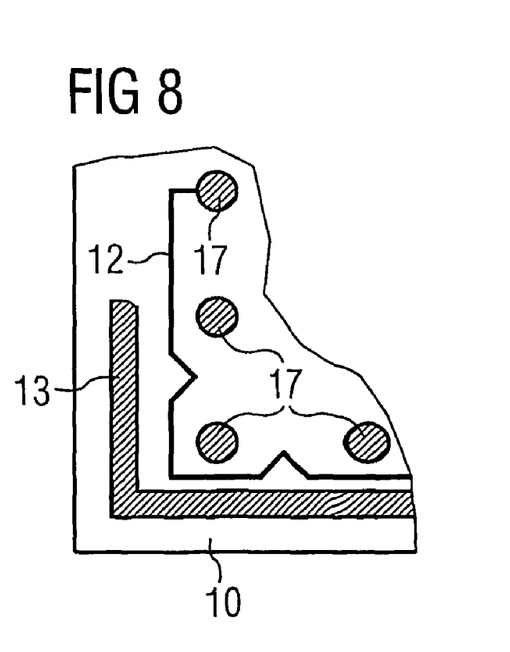
FIG. 8 schematic conductive structures of a laminar sensor for the frame circuit board.

Referring to FIG. 8, we will again go into the lateral laminar sensor, realized in the form of a side sensor in the frame 10 by the conductive structures 12. Here, FIG. 8 shows a section through the frame 10, where the plane of the section is turned through 90° compared to that in FIG. 4.

From this, one can see the structure of an individual conductive layer in the lateral laminar sensor for protection against drilling into the end-face. In the conductive layers, that is in the signal and voltage layers of the multilayer circuit board of the frame 10, each of the conductive structures 12 is in the form of a ring-shaped meandering sensory conductor, which runs around the outside of the contact points 17 which are to be protected and is in electrical contact with the inside through μ-vias.

The dielectric spacing of the hardware protection layers in the circuit boards 2, 7, 10 of the submodules is selected such that even in the case of an end-face attack damage will result to at least one protective layer, and thus the protective mechanism will be triggered.

The laminar sensors completely surround the interior space which is to be protected, and together form a linked sensory network with the following functions:

Detection of attacks by interruption of the sensor wires,

Detection of attacks by digital recognition of short circuits to ground from the sensor lines which are connected to positive potential, Detection of attacks by analog recognition of short circuits to ground from the sensor wires, raised to various voltages, which are connected to negative potential;

Detection of combinations of the above analog and digital attacks.

As described above, the result is a sensor system which is integrated into the circuit substrate in the form of circuit boards, which can be manufactured using conventional "high-tech" circuit board technology, and which can have components inserted and can be processed on conventional component insertion lines in production facilities for electronic modules. Furthermore, it gives the advantage of a secure, cost-effective security system, which can be processed with no additional assembly cost, directly provided and integrated into the electronic module, which reliably detects hardware attacks.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A protected tachograph system comprising:
   at least one circuit substrate which surrounds an interior space to be protected;
   a laminar sensor provided on each circuit substrate to surround the interior space and to detect intrusion into the interior space, each laminar sensor comprising:
      a plurality of independent conductive structures provided within a first layer of the circuit substrate with insulating gaps running between runs of the conductive structures such that within the first layer, the conductive structures are electrically isolated from one another, the conductive structures forming geometric shapes which respectively extend in a plurality of directions, each geometric shape having at least two conducting tracks at different electric potentials; and
      a second layer parallel with and adjacent to the first layer, the second layer providing electrical connections for the conductive structures provided on the first layer; and
   a tachograph being provided within the interior space such that circuits of the tachograph are protected from intrusion.

2. The protected tachograph of claim 1, wherein
   the conductive structures form respective sensor segments,
   each geometric shape has a start point and an end point corresponding to contact points for the sensor segment, and
   at least one of the start point and the end point is provided at a center of each geometric shape.

3. The protected tachograph of claim 1, wherein
   the conductive structures of the geometric shapes are conductive runs provided parallel to each other and in opposite directions, and
   different geometric shapes are provided on a common layer.

4. The protected tachograph of claim 1, wherein
   the conductive structures form respective sensor segments, and
   the second layer is provided with conductive structures having respective geometric shapes which correspond to the geometric shapes of the sensor segments, but are arranged relative to the sensor segments such that the conductive structures are arranged to be offset relative to each other.

5. The protected tachograph of claim 1, wherein
   each circuit substrate has a surface facing the interior space to be protected,
   each circuit substrate has a plurality of layers of conductive structures running generally parallel to the surface, and
   an insulating layer is provided between adjacent layers of conductive structures.

6. The protected tachograph of claim 1, wherein the conductive structures follow a meandering course having rounded corners.

7. The protected tachograph of claim 2, wherein
   each sensor segment has connected first and second geometric shapes, each geometric shape having a respective center,
   the start point is located at the center of the first geometric shape, and
   the end point is located at the center of the second geometric shape.

8. A protected tachograph system comprising:
   at least one circuit substrate which surrounds an interior space to be protected, each circuit substrate having a first layer occupying an area;
   a laminar sensor provided on each circuit substrate to surround the interior space and to detect intrusion into the interior space, each laminar sensor comprising a plurality of independent conductive structures provided within the first layer of the circuit substrate, with insulating gaps running between runs of the conductive structures such that within the first layer, the conductive structures are electrically isolated from one another, each conductive structure forming a two dimensional geometric shape within the first layer such that the first layer contains a plurality of geometric shapes and each geometric shape occupies a distinct and separate portion of the area of the first layer, the geometric shape having a center, each conductive structure having at least one of a conduction start point and a conduction end point provided at the center of the geometric shape; and
   a tachograph being provided within the interior space such that circuits of the tachograph are protected from intrusion.

9. The protected tachograph system of claim 8, wherein each geometric shape is formed by a plurality of conductor tracks arranged at different potentials.

10. The protected tachograph system of claim 8, wherein
    the conductive structures of the geometric shapes are conductive runs provided parallel to each other and in opposite directions, and
    different geometric shapes are provided on a common layer.

11. The protected tachograph system of claim 8, wherein
    the conductive structures form respective sensor segments, and
    the laminar sensor comprises a wiring layer via which electrical contact is made with the sensor segments.

12. The protected tachograph system of claim 11, wherein the wiring layer is provided with conductive structures having respective geometric shapes which correspond to the geometric shapes of the sensor segments, but are arranged relative to the sensor segments such that the conductive structures are arranged to be offset relative to each other.

13. The protected tachograph system of claim 8, wherein
each circuit substrate has a surface facing the interior space to be protected,
each circuit substrate has a plurality of layers of conductive structures running generally parallel to the surface, and
an insulating layer is provided between adjacent layers of conductive structures.

14. The protected tachograph system of claim 8, wherein the conductive structures follow a meandering course having rounded corners.

15. The protected tachograph of claim 8, wherein
each conductive structure has connected first and second geometric shapes, each geometric shape having a respective center,
the conduction start point is located at the center of the first geometric shape, and
the conduction end point is located at the center of the second geometric shape.

16. A protected tachograph system comprising:
at least one circuit substrate which surrounds an interior space to be protected;
a laminar sensor provided on each circuit substrate to surround the interior space and to detect intrusion into the interior space, each laminar sensor comprising:
a first layer having a plurality of independent conductive structures with insulating gaps running between runs of the conductive structures such that within the first layer, the conductive structures are electrically isolated from one another, each conductive structure forming a two dimensional geometric shape within the first layer such that the first layer has a plurality of different geometric shapes; and
a second layer parallel with and adjacent to the first layer, the second layer having a plurality of independent conductive structures with insulating gaps running between runs of the conductive structures such that within the second layer, the conductive structures are electrically isolated from one another, each conductive structure forming a two dimensional geometric shape within the second layer such that the second layer has a plurality of different geometric shapes, the geometric shapes in the second layer being offset from and not aligned with the geometric shapes in the adjacent first layer; and
a tachograph being provided within the interior space such that circuits of the tachograph are protected from intrusion.

17. The protected tachograph system of claim 16, wherein each geometric shape is formed by a plurality of conductor tracks arranged at different potentials.

18. The protected tachograph system of claim 16, wherein
the conductive structures form respective sensor segments,
each geometric shape has a start point and an end point corresponding to contact points for the sensor segment, and
at least one of the start point and the end point is provided at a center of each geometric shape.

19. The protected tachograph of claim 18, wherein
each sensor segment has connected first and second geometric shapes, each geometric shape having a respective center,
the start point is located at the center of the first geometric shape, and
the end point is located at the center of the second geometric shape.

20. The protected tachograph system of claim 16, wherein
the conductive structures form respective sensor segments, and
the laminar sensor comprises a wiring layer via which electrical contact is made with the sensor segments.

21. The protected tachograph system of claim 16, wherein
each circuit substrate has a surface facing the interior space to be protected,
each circuit substrate has a plurality of layers of conductive structures running generally parallel to the surface, and
an insulating layer is provided between adjacent layers of conductive structures.

22. The protected tachograph system of claim 16, wherein the conductive structures follow a meandering course having rounded corners.

23. The protected tachograph system of claim 8, wherein
each conductive structure forms a two dimensional triangular geometric shape within the first layer such that the first layer contains a plurality of triangular geometric shapes.

* * * * *